United States Patent [19]

Goldhammer et al.

[11] Patent Number: 4,709,197
[45] Date of Patent: Nov. 24, 1987

[54] CONTROL DEVICE FOR DRIVING E.G. A SHREDDING MACHINE OR A SIMILAR MACHINE

[75] Inventors: Albert Goldhammer, Ueberlingen; Hans Schleicher, Markdorf; Hartmut Stangenberg, Owingen; Rolf Gasteier, Markdorf; Jens Erlecke, Wolfegg, all of Fed. Rep. of Germany

[73] Assignee: Feinwerktechnik Schleicher & Co., Fed. Rep. of Germany

[21] Appl. No.: 883,352

[22] Filed: Jul. 8, 1986

[51] Int. Cl.[4] .......................... B02C 25/00; H02H 7/08
[52] U.S. Cl. .................................... 318/480; 318/490; 340/525; 340/635; 241/36
[58] Field of Search ............... 318/480, 490, 640, 650, 318/652; 361/23; 340/500, 524, 525, 635, 648, 664; 241/36

[56] References Cited

U.S. PATENT DOCUMENTS 2,232,519  2/1941  Goff ..................................... 318/466
3,530,337  9/1970  Moore .............................. 340/648 X
4,363,061 12/1982  Vaerewyck et al. ................. 361/31

FOREIGN PATENT DOCUMENTS 3412306  10/1985  Fed. Rep. of Germany ........ 241/36
54-10952   1/1979  Japan ................................. 318/490
56-51669   5/1981  Japan ................................. 318/480
57-97102   6/1982  Japan ................................. 318/480
58-16305   1/1983  Japan ................................. 318/480
59-32389   2/1984  Japan ................................. 318/480
59-169387  9/1984  Japan ................................. 318/490

Primary Examiner—Bentsu Ro
Attorney, Agent, or Firm—Steele, Gould & Fried

[57] ABSTRACT

In an electrically powered machine subject to occasional blockage, the speed, power consumption, torque and/or rate of deceleration are displayed by successive illumination of light-emitting diodes in a row. Predetermined limit values for these parameters alone or summed with one another are defined and optical couplers are positioned at corresponding locations on the row to detect parameters reaching the limits. Detection causes initiation of disconnection, braking, reversal or other means for alleviating the stoppage.

7 Claims, 1 Drawing Figure

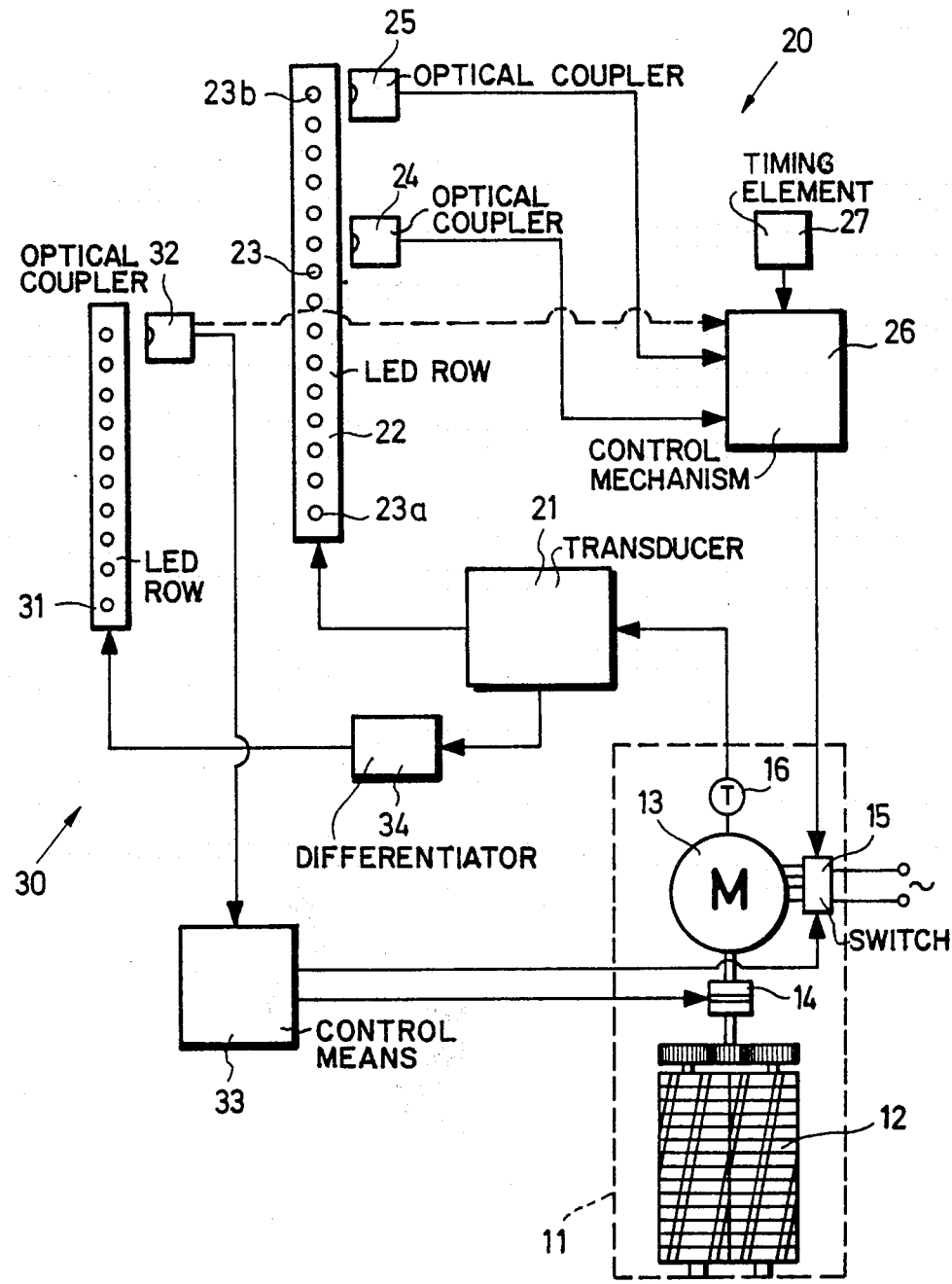

CONTROL DEVICE FOR DRIVING E.G. A SHREDDING MACHINE OR A SIMILAR MACHINE

BACKGROUND OF THE INVENTION

Shredding or similar machines are subject to widely varying loading in operation and as a result of material blocking the cutting rollers are often decelerated to zero speed (stalled). Normally the drive motor is not switched off until this stage is reached. It is in part left to the operator to then switch off or reverse the motor, in order to remove the excess material blocking the cutting rollers. It is also known to increase power to the motor by connecting a second motor winding before the motor is stopped. This control is conventionally performed in current-dependent manner.

SUMMARY OF THE INVENTION

The problem of the present invention is to provide an improved control device, enabling the control process to be performed very accurately and sensitively, while ensuring maximum protection of the electrical and mechanical drive parts.

According to the invention this problem is solved in that a control display element with a plurality of light-emitting diodes (LED) is driven in stepwise successive manner as a function of a voltage supplied to the control display element. When the element is driven through one or an other of the stages a signal is generated which, by means of a control mechanism, brings about a control, such as a switching off, switching over, stoppage, rearward operation or a disengagement of the drive.

Thus, it is possible to use a commercially available light-emitting diode array defining a row or line, with a plurality of operational amplifiers connected in series cascade. These can be housed in an integrated circuit and when the voltage input reaches specific voltage stages the amplifiers successively drive the light-emitting diodes. Intervention for tapping the signal can be accomplished by direct connection to the individual stages, e.g. to the integrated circuit outputs connected into the individual light-emitting diodes, but can be more advantageously and flexibly performed by means of at least one optical coupler, which generates its signal as a function of the lighting up of one or more specific light-emitting diodes in the row. Thus, for example, one light-emitting diode could be used for switching over the motor to increased power and another could be used for switching off and reversing the motor in the highest loading stage. The control display element can receive the voltage which it has to process from various different types of generators, particularly drive values, such as power consumption (current), speed, torque, etc.

This leads to a particularly sensitive and simple control device. A display and a control are obtained, both being intimately associated with one another such that the display of maximum loading simultaneously always initiates switching off. Thus, the user can depend on the displayed values reflecting the machine functions and by means of a corresponding loading can ensure that instances of overloading do not occur. Thus, the light-emitting diode row can be differently coloured in the various areas, e.g. green in normal operation, yellow in the higher power stage to red in the overload range. The optical couplers preferably respond directly to the lighting up of specific light-emitting diodes, but could also respond to different colours or a different light intensity when several light-emitting diodes light up.

It is possible to associate a timing element with the control mechanism, which processes the signals and controls the drive. For example, in the case of loading close to the maximum loading limit, said timing element can switch the motor off, so as to avoid overheating the motor, whereas short-term operation in excess of this limit is allowed. This timing element can also be used to override a loading peak on starting up the drive without the peak causing a switch off.

The use of a light-emitting diode row leads to an excellent display of a range of operational parameters and to a reliable drive in individual stages. The characteristics of the light-emitting diode row make it possible to take account of the characteristics of the drive motor and the loading conditions and this is additionally possible through the choice of the individual stages provided for applying the signal, i.e. the individual light-emitting diodes. Thus, empirically, by displacing the optical couplers with respect to the row, it is possible to modify the disconnection and control characteristics.

As has previously been stated, the sudden blocking of the cutting equipment causes a serious problem because said blocking, e.g. through metal parts being accidentally introduced into the shredding machine, can take place so rapidly that not only can the cutting equipment and driving mechanism be damaged, but more particularly also the electric motor. Thus, an attempt must be made to protect the drive and consequently particularly the electric motor against peak loads, which occur when the motor is blocked. Thus, according to an advantageous feature of the invention, it is proposed that the drive is controlled as a function of rate of change of the drive values, such as the power consumption, speed, torque, etc. Thus, a disconnection, braking, disengagement or the like can be initiated, before blocking occurs. Whereas e.g. a normal power increase or a braking of the motor falling within the scope of normal operation causes no response, a serious slow-down or a great increase in power consumption would lead to the motor being switched off. Therefore in the case of the expected sudden deceleration prior to blocking, the motor would not continue to "feed" with full power. It is also possible to simultaneously use this control for switching on a motor brake or to initiate disengagement, so that e.g. deceleration due to blocking of the cutting rollers is assisted on the motor side or is limited by a clutch on the cutting equipment, whereas the motor and the remaining drive can coast normally.

This makes it possible to significantly reduce harmful effects of blocking for both motor and mechanism, without any significant increase in the expense of construction and without reducing the efficiency of the equipment. The life of the motor and drive can be significantly increased. This control as a function of the rate of change can additionally be used for disconnection purposes on the basis of limit values, for current, speed, torque, etc., and can advantageously be combined therewith, in that the individual signals which initiate disconnection can be added and e.g. a short-term significant stoppage or deceleration can be made to lead particularly rapidly to a disconnection if the equipment is operating in the upper power range, whereas in the lower power range disconnection only takes place at higher deceleration values.

Features of preferred further developments of the invention can be gathered from the description, drawing and subclaims, and the individual features can be realized individually or in various sub-combinations.

DESCRIPTION OF THE DRAWING AND PREFERRED EMBODIMENT

An embodiment of the invention is shown in the drawing, which shows a circuit diagram and is explained in greater detail hereinafter.

A diagrammatically indicated shredding machine 11 has two meshing cutting rollers 12, which are driven in opposite directions and between which documents can be shredded ranging from individual sheets to complete files, including the paper attachment mechanisms and also other waste. By means of a geared drive and a clutch 14, cutting rollers 12 are driven by a motor 13, which is controlled by a contact-operated switch 15. The motor preferably has two windings, which can be successively switched on for producing several power stages. A tachogenerator 16 generates an output signal corresponding to speed and is supplied to a light-emitting diode row 22 either directly or via a transducer 21. It comprises a control display element with a plurality of successively connected light-emitting diodes (LED) 23, which are successively activated in stepwise manner as a function of the voltage supplied. Diode 23a indicates the bottom stage progressing to diode 23b indicating the top stage. Such a light-emitting diode row is marketed by Siemens under the designation UAA 180. Optical couplers 24, 25, i.e. electronic switching means, which generate or modify a signal as a function of light absorption are associated with certain light-emitting diodes in the row, and contain light-sensitive transistors. Optical couplers 24, 25 are connected to a control mechanism 26, on which a timing element 27 acts or with which the timing element is integrated. The described arrangement forms a control device 20 for controlling drive motor 13.

A further control mechanism 30 receives its input signal in the present case from tachogenerator 16 via transducer 21 and additionally via a differentiator 34, so that the light-emitting diode row 31 connected thereto is driven as a function of the rate of change of the input signal. An optical coupler 32 responds if a particular time lag occurs, i.e. if the tachogenerator signal indicates that the motor has been greatly decelerated. Optical coupler 32 operatively affects a control means 33 which, in an arbitrary or alternative manner, switches off motor 13 via switching element 15 and disengages the electromagnetic clutch 14 between the motor and cutting mechanism. In addition to or instead of the same, it is also possible to activate a brake (not shown) for braking the motor.

A connecting line, indicated in broken line manner, which leads from coupler 32 to the control mechanism 26 can be provided for alternative operation or instead of the control means 33, so that it is possible to carry out the aforementioned combination of absolute and differentiated data. A different threshold switch can be used in place of light-emitting diode line 31 with optical coupler 32. However, the light-emitting diode line has the advantage of permitting easy tapping of the signal along a range at random points and of functioning virtually with no time lag.

In the case of a normally loaded cutting mechanism, the light-emitting diode row 22 displays the normal speed in the lower region close to light-emitting diode 23a. However, row 31 displays certain minor speed changes. Also, optionally the zero can be adjusted in such a way that both acceleration and deceleration are displayed.

On introducing the material which cannot be cut by the cutting equipment in a single passage, e.g. an object which is too large to pass in one go through the cutting rollers, or also metal or other hard objects, which cannot be immediately shredded, cutting mechanism 12 is considerably decelerated. As a result, the speed of the rolls drops. This leads to light-emitting diode row 22 displaying an increase along its range (i.e., the sense of operation of the diode row is reversed, compared to speed) as the light display rises in the direction of diode 23b. By means of differentiator 34, diode row 31 displays the rate of change in speed, i.e., deceleration. If this change is very sudden, then optical coupler 32 responds before the speed has dropped to such an extent that optical couplers 24 or 25 respond. This leads to a disconnection of the motor and optionally a disengagement of clutch 14, so that the cutting mechanism is now overloaded by its own inertia but is not also loaded by the motor and its drive power when it is blocked.

In the case of deceleration at a lower rate, e.g. as a result of a stack of paper which overburdens the motor, but does not lead to stoppage, the deceleration remains in the permitted range, but the speed drops to such an extent that first optical coupler 24 responds and the second motor winding is switched in. If this is sufficient, the speed rises again and with a certain time lag or hysteresis which can be brought about by a further optical coupler, the second winding switches off again. However, if despite the second winding the power is still not sufficient, diode 23b finally lights up and by means of the control mechanism 26, optical coupler 25 brings about a disconnection of the motor and optionally a reversal in order to discharge the blocking material in the opposite direction. Timing element 27 can bring about a certain delay, which can be set as a function of the particular load or time lag.

In the present embodiment, the motor speed is used as the input value for control devices 20, 30. It would also advantageously be possible to use the power consumption of the motor (current) or its actual torque, e.g. via a torque pickup connected in the drive train, so that in place of the presently shown speed limits, the light-emitting diode row 22 would display and evaluate a corresponding torque or power upper limit. The light-emitting diode rows can be internally integrated into the equipment, but are preferably also visible from the outside, so that they can fulfil their additional display function. The control device can be used with particular advantage for shredding machines and equipment with similar cutting mechanisms and which are subject to widely varying loads sometimes causing stoppage. However, it could also be used in other equipment, particularly for waste processing or utilization if, in such cases, the inhomogeneity of the material can lead to blockage, e.g. balers. The rapid and simple signal processing by means of reliable commercial equipment easily adaptable to the particular use is very advantageous. The optical couplers can e.g. be constituted by Siemens component CNY 17.

It is possible to simultaneously process several input values (load, speed, torque, etc) for the control dependent both on the absolute values and on the load rate of change, in order e.g. in the case of current consumption to take account of whether exceeding the prescribed limits takes place at a higher or lower speed. This summing or other combination of parameter values, as well as control based on absolute values and load rates of change, can be accomplished before or after the result if compared to a threshold for operation of control mechanism 26 (e.g. in transducer 21), so that only one common threshold comparator is required.

What is claimed is:

1. A shredding machine, comprising:
   a shredding mechanism having movable means for contacting material to be shredded;
   an electric motor operative to drive the shredding mechanism, the electric motor being electrically connectable to a source of electrical energy and mechanically connectable to the shredding mechanism, through a control device, the control device including:
   means developing electrical signals having values representing instantaneous operational parameters of the motor;
   a differentiating means having an input and output, the input being connected to receive at least one of the signals representing the operational parameters of the motor and the output reflecting an instantaneous rate of change of said at least one signal, the output of the differentiating means being connected to a control means through a light source responsive to said output and an optical coupling means responsive to said light source, the control means generating a control output in response to the output of the differentiating means, the control output being connected to means for altering said operational parameters.

2. The shredding machine of claim 1, wherein the light source is a part of at least one display means for the shredding machine, the at least one display means having a plurality of light-emitting diodes (LEDs) of which said light source is one, the light emitting diodes being controlled to light in succession as a function of variation in said operational parameters.

3. The shredding machine of claim 1, wherein the light source is one of a plurality of light emitting diodes (LEDs) in a display, and the optical coupling means is responsive to one of the LEDs in the display, the display representing at least one of the operational parameters and rates of change of the operational parameters.

4. The shredding machine of claim 1, wherein the operational parameters are one of power consumption, current, speed and torque.

5. The shredding machine of claim 1, wherein the control output is operable to accomplish one of disconnection of power, connection of additional power, braking, reversing and mechanical decoupling of the motor.

6. The shredding machine of claim 1, further comprising a delay means for timing operation of the control device.

7. A shredding machine, comprising:
   a shredding mechanism drivable by an electric motor, the shredding mechanism being subject to blockage;
   at least one sensor operable to develop a signal having a value varying as a function of an operational parameter of the shredding machine that varies with loading of the shredding mechanism;
   a control means operable to generate an output to alleviate loading of one of the shredding mechanism and the electric motor;
   a display means having a plurality of light emitting diodes (LEDs) in an array, the light emitting diodes being sequentially operable for indicating a rate of change of said operational parameters indicating loading; and,
   an optical detector responsive to at least one of the LEDs in the display means, said optical detector being connected to the control means, whereby the control means is operable to alleviate loading on one of the shredding mechanism and the motor when the rate of change of said operational parameters indicating loading exceed a threshold.

* * * * *